(12) United States Patent  
Sendai et al.

(10) Patent No.: US 10,114,610 B2  
(45) Date of Patent: Oct. 30, 2018

(54) DISPLAY DEVICE, METHOD OF CONTROLLING DISPLAY DEVICE, AND PROGRAM

(71) Applicant: SEIKO EPSON CORPORATION, Tokyo (JP)

(72) Inventors: Kaori Sendai, Okaya (JP); Atsunari Tsuda, Suwa (JP); Masahide Takano, Matusmoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/598,961

(22) Filed: May 18, 2017

(65) Prior Publication Data

US 2017/0255447 A1  Sep. 7, 2017

Related U.S. Application Data

(63) Continuation of application No. 14/720,275, filed on May 22, 2015, now Pat. No. 9,684,486.

(30) Foreign Application Priority Data

Jul. 31, 2014 (JP) ................................. 2014-156699

(51) Int. Cl.  
*G06F 3/16* (2006.01)  
*G06T 19/00* (2011.01)  
(Continued)

(52) U.S. Cl.  
CPC ........... *G06F 3/167* (2013.01); *G02B 27/017* (2013.01); *G02B 27/0172* (2013.01);  
(Continued)

(58) Field of Classification Search  
CPC ...... G06F 3/167; G06F 3/005; G02B 27/0172; G02B 2027/0178; G02B 2027/014;  
(Continued)

(56) References Cited

U.S. PATENT DOCUMENTS

2004/0037437 A1* 2/2004 Symons ................. H04R 3/005  
381/92  
2013/0182858 A1* 7/2013 You ......................... G06F 3/167  
381/58  
(Continued)

FOREIGN PATENT DOCUMENTS

JP  2005-165778 A  6/2005  
JP  2014056217 A  3/2014

OTHER PUBLICATIONS

Sep. 22, 2016 U.S. Office Action Issued in U.S. Appl. No. 14/720,275.

*Primary Examiner* — Sahlu Okebato  
(74) *Attorney, Agent, or Firm* — Oliff PLC (57) ABSTRACT

A head mounted display device is used by being mounted on a body of a user and includes an image display unit through which outside scenery is transmitted and which displays an image such that the image is visually recognizable together with the outside scenery. Further, the head mounted display device includes a right headphone and a left headphone outputting a sound. Further, the head mounted display device includes a target detection unit that detects a target of the user in the visual line direction; a distance detection unit that detects a distance between the detected target and the user; and an information output control unit that controls the output of the sound of the right headphone and the left headphone according to the detected distance.

14 Claims, 5 Drawing Sheets

(51) Int. Cl.
*G02B 27/01* (2006.01)
*G06F 3/00* (2006.01)
*G06F 3/01* (2006.01)
*G06F 3/03* (2006.01)

(52) U.S. Cl.
CPC .............. *G06F 3/005* (2013.01); *G06F 3/011* (2013.01); *G06F 3/0304* (2013.01); *G06T 19/006* (2013.01); *G02B 2027/014* (2013.01); *G02B 2027/0138* (2013.01); *G02B 2027/0141* (2013.01); *G02B 2027/0178* (2013.01)

(58) Field of Classification Search
CPC .... G02B 2027/0141; G02B 2027/0138; G06T 19/006
See application file for complete search history.

(56) References Cited

U.S. PATENT DOCUMENTS

2014/0140579 A1    5/2014   Takemoto
2015/0304790 A1*  10/2015   Yamashita ............... G06F 21/32
                                                          381/303
2016/0189286 A1*   6/2016   Zohar ................ G06K 9/00355
                                                          348/150

* cited by examiner

DISPLAY DEVICE, METHOD OF CONTROLLING DISPLAY DEVICE, AND PROGRAM

CROSS-REFERENCE TO RELATED APPLICATION

This is a Continuation of application Ser. No. 14/720,275 filed May 22, 2015, which in turn claims priority to Japanese Patent Application JP 2014-156699 filed Jul. 31, 2014. The disclosure of the prior applications is hereby incorporated by reference herein in their entirety.

BACKGROUND

1. Technical Field

The present invention relates to a display device, a method of controlling a display device, and a program.

2. Related Art

In the related art, as a display device, a wearable display device having a function of displaying sentences is known (see JP-A-2014-56217). The device disclosed in JP-A-2014-56217 changes display attributes such as the font size or the color of characters of some characters or words in sentence data such that a user can easily grasp the contents of displayed sentence data.

In the device disclosed in JP-A-2014-56217, the display attributes are changed corresponding to the contents of information to be displayed. In this manner, a technique of controlling an output in correspondence with information to be displayed has been suggested, but a technique of controlling an output of information in correspondence with the external circumstances of a device or a user using the device has not been suggested in the related art.

SUMMARY

An advantage of some aspects of the invention is to provide a display device that outputs information corresponding to external factors outside of the device, a method of controlling a display device, and a program.

An aspect of the invention is directed to a display device which is used by being mounted on a body of a user, including: a display unit through which outside scenery is transmitted and that displays an image such that the image is visually recognizable together with the outside scenery; a sound output unit that outputs a sound; a target detection unit that detects a target of the user in a visual line direction; a distance detection unit that detects a distance between the target detected by the target detection unit and the user; and a sound control unit that controls the output of the sound from the sound output unit according to the distance detected by the distance detection unit.

According to the aspect of the invention, it is possible to output the sound corresponding to the external factor of the display device.

The display device may further include a data acquisition unit that acquires sound data related to the target and the sound control unit may allow the sound output unit to output a sound based on the sound data acquired by the data acquisition unit in a case where the distance detected by the distance detection unit is longer than a predetermined distance.

According to the aspect of the invention with this configuration, it is possible to control the output of the sound corresponding to the distance between the display device and the target.

The display device may further include an imaging unit that images the visual line direction of the user and the target detection unit may detect the target visually recognized by the user through the display unit based on the captured image of the imaging unit.

According to the aspect of the invention with this configuration, it is possible to detect the target of the user in the visual line direction based on the captured image.

In the display device, the target detection unit may detect a state of the target visually recognized by the user through the display unit based on the captured image of the imaging unit and the sound control unit may allow the sound output unit to output the sound based on the sound data acquired by the data acquisition unit according to the state of the target detected by the target detection unit.

According to the aspect of the invention with this configuration, it is possible to output the sound corresponding to the state of the target detected from the captured image.

In the display device, the sound control unit may allow the sound output unit to output a voice of a person or a sound that mimics a voice of a person.

According to the aspect of the invention with this configuration, it is possible to make the user hear a voice of a person or a sound that mimics a voice of a person.

In the display device, the sound control unit may convert sound data acquired by the data acquisition unit to sound data including a component of a predetermined frequency bandwidth and allow the sound output unit to output a sound based on the converted sound data.

According to the aspect of the invention with this configuration, since a frequency component including sound data can be converted, a process of increasing the component in the frequency bandwidth in which the user can easily hear the sound or a process of making a voice of a person be heard louder than noise can be performed.

In the display device, the sound output unit may be a headphone used by being mounted on the user.

According to the aspect of the invention with this configuration, there is an advantage that the sound output to the user is unlikely to leak to the surrounding area.

The display device may further include a sound detection unit and the data acquisition unit may acquire data of a sound collected by the sound detection unit.

According to the aspect of the invention with this configuration, it is possible to acquire an environmental sound and output the acquired sound.

In the display device, the sound control unit may allow the sound detection unit to detect a sound made by the target detected by the target detection unit and allow the sound output unit to output the detected sound or a sound having the content which is the same as the content of the detected sound.

According to the aspect of the invention with this configuration, it is possible to output the detected sound or a sound having the same content as the detected sound.

In the display device, the sound output unit may change a frequency component of the sound data acquired by the data acquisition unit based on the distance detected by the distance detection unit.

According to the aspect of the invention with this configuration, it is possible to change the frequency component of a sound to be output based on the distance from the target.

Another aspect of the invention is directed to a method of controlling a display device that includes a display unit through which outside scenery is transmitted and which displays an image such that the image is visually recognizable together with the outside scenery and a sound output unit which outputs a sound and that is used by being mounted on a body of a user, including: detecting a target of the user in a visual line direction; detecting a distance between the detected target and the user; and controlling the output of the sound according to the detected distance.

According to the aspect of the invention, it is possible to output a sound corresponding to the external factor of the display device.

Still another aspect of the invention is directed to a program which can be executed by a computer controlling a display device that includes a display unit through which outside scenery is transmitted and which displays an image such that the image is visually recognizable together with the outside scenery and a sound output unit which outputs a sound and that is used by being mounted on a body of a user, the program causing the computer to function as: a target detection unit that detects a target of the user in a visual line direction; a distance detection unit that detects a distance between the target detected by the target detection unit and the user; and a sound control unit that controls the output of the sound from the sound output unit according to the distance detected by the distance detection unit.

According to the aspect of the invention, it is possible to output a sound corresponding to the external factor of the display device.

BRIEF DESCRIPTION OF THE DRAWINGS

The invention will be described with reference to the accompanying drawings, wherein like numbers reference like elements.

FIGS. 5A to 5C are views illustrating typical application examples of the head mounted display device.

DESCRIPTION OF EXEMPLARY EMBODIMENTS

Figure 1:
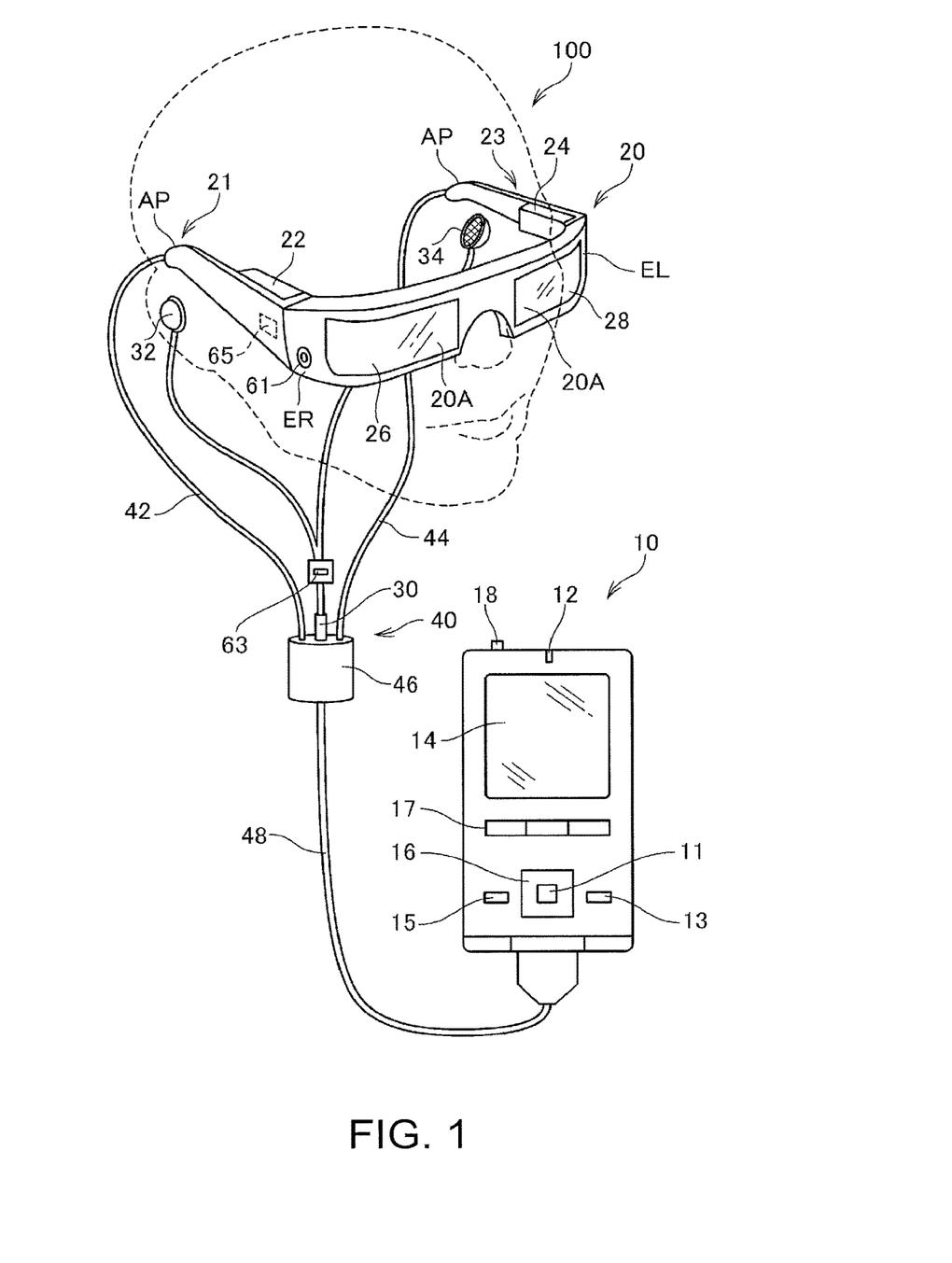
FIG. 1 is a view illustrating an external configuration of a head mounted display device.

FIG. 1 is an explanatory view illustrating an external configuration of a head mounted display device 100. The head mounted display device 100 is a display device that is mounted on a head and referred to as a head mounted display (HMD). The head mounted display device 100 according to the present embodiment is an optical transmission type head mounted display device in which the outside scenery can be directly visually recognized at the same time as when a virtual image is visually recognized by a user. Further, in the present specification, the virtual image visually recognized by the user using the head mounted display device 100 is conveniently referred to as a "display image." Further, emitting image light generated based on image data is expressed as "displaying an image."

The head mounted display device 100 includes an image display unit 20 that allows the user to visually recognize a virtual image in a state in which the head mounted display device is mounted on the head of the user and a control device 10 that controls the image display unit 20. The control device 10 functions as a controller used for the user to operate the head mounted display device 100. The image display unit 20 is also simply referred to as a "display unit."

The image display unit 20 is a mounted body to be mounted on the head of the user and has a shape of glasses in the present embodiment. The image display unit 20 includes a right holding unit 21, a right display driving unit 22, a left holding unit 23, a left display driving unit 24, a right optical image display unit 26, a left optical image display unit 28, a camera 61 (imaging unit), and a microphone 63. The right optical image display unit 26 and the left optical image display unit 28 are respectively arranged so as to be positioned in front of right and left eyes of the user when the image display unit 20 is mounted on the head of the user. One end of the right optical image display unit 26 and one end of the left optical image display unit 28 are connected to each other in a position corresponding to a place between eyebrows of the user when the image display unit 20 is mounted on the head of the user.

The right holding unit 21 is a member provided in a state of being extended from an end portion ER which is the other end of the right optical image display unit 26 to a position corresponding to a side head portion of the user when the image display unit 20 is mounted on the head of the user. Similarly, the left holding unit 23 is a member provided in a state of being extended from an end portion EL which is the other end of the left optical image display unit 28 to a position corresponding to a side head portion of the user when the image display unit 20 is mounted on the head of the user. The right holding unit 21 and the left holding unit 23 hold the image display unit 20 on the head portion of the user in a shape of temples (bows) of glasses.

The right display driving unit 22 and the left display driving unit 24 are arranged on the side facing the head portion of the user when the image display unit 20 is mounted on the user. Hereinafter, the right holding unit 21 and the left holding unit 23 are simply and collectively referred to as "holding units," the right display driving unit and the left display driving unit 24 are simply and collectively referred to as "display driving units," and the right optical image display unit 26 and the left optical image display unit 28 are simply and collectively referred to as "optical image display units."

The display driving units 22 and 24 include liquid crystal displays 241 and 242 (hereinafter, also referred to as "LCDs 241 and 242") or projection optical systems 251 and 252 (see FIG. 2). The details of the configurations of the display driving units 22 and 24 will be described below. The optical image display units 26 and 28 serving as optical members include light guide plates 261 and 262 (see FIG. 2) and a light adjusting plate 20A. The light guide plates 261 and 262 are formed of a resin with optical transparency or the like and guide image light output from the display driving units 22 and 24 to the eyes of the user. The light adjusting plate 20A is a thin plate-like optical element and is arranged so as to cover the front side of the image display unit 20 which is the opposite side of the eyes of the user. As the light adjusting plate 20A, various plates such as a plate with substantially no optical transparency, a nearly transparent plate, a plate through which light is transmitted by attenuating the amount of light, and a plate that attenuates or reflects light with a specific wavelength can be used. By suitably selecting optical characteristics (optical transmittance and the like) of the light adjusting plate 20A, the amount of external light which is incident to the right optical image display unit 26 and the left optical image display unit 28 from the outside is adjusted and thus ease of visual recognition of a virtual image can be adjusted. In the present embodiment, a case in which the light adjusting plate 20A having optical transparency at least to the extent that the outside scenery can be visually recognized by the user on which the head mounted display device 100 is mounted is used is described. The light adjusting plate 20A protects the right light guide plate 261 and the left light guide plate 262 so that damage of the right light guide plate 261 and the left light guide plate 262 and adhesion of dirt thereto are suppressed.

The light adjusting plate 20A can be detachably attached to the right optical image display unit 26 and the left optical image display unit 28, plural kinds of light adjusting plates 20A are replaceable and can be mounted, or the light adjusting plate may be omitted.

The camera 61 is arranged in the end portion ER which is the other end of the right optical image display unit 26. The camera 61 images the outside scenery which is the outside view in a direction on the opposite side of the eyes of the user and acquires an image of the outside scenery. The camera 61 of the present embodiment illustrated in FIG. 1 is a single-lens camera, but may be a stereo camera.

An imaging direction, that is, the angle of view of the camera 61 is a front side direction of the head mounted display device 100, in other words, a direction in which at least a part of the outside scenery in the visual field direction of the user is imaged in a state of the head mounted display device 100 being mounted on the user. Further, the range of the angle of view of the camera 61 can be suitably set, but it is preferable that the imaging range of the camera 61 is a range including the outside world (outside scenery) that is visually recognized by the user through the right optical image display unit 26 and the left optical image display unit 28. Further, it is more preferable that the imaging range of the camera 61 is set such that the entire visual field of the user through the light adjusting plate 20A can be imaged.

The image display unit 20 further includes a connecting unit 40 that connects the image display unit 20 with the control device 10. The connecting unit 40 includes a main cord 48 connected to the control device 10, a right cord 42, a left cord 44, and a coupling member 46. The right cord 42 and the left cord 44 are cords in which the main cord 48 is branched into two cords. The right cord 42 is inserted into a housing of the right holding unit 21 from the tip portion AP of the right holding unit 21 in the extension direction and connected to the right display driving unit 22. Similarly, the left cord 44 is inserted into a housing of the left holding unit 23 from the tip portion AP of the left holding unit 23 in the extension direction and connected to the left display driving unit 24.

The coupling member 46 is provided in a branch point of the main cord 48, the right cord 42, and the left cord 44 and includes a jack for connecting a headphone plug 30. A right headphone 32 and a left headphone 34 are extended from the headphone plug 30 as a sound output unit. A microphone 63 (sound detecting unit) is provided in the vicinity of the headphone plug 30. The cords are combined into one cord from the headphone plug 30 to the microphone 63, branched from the microphone 63, and respectively connected to the right headphone 32 and the left headphone 34. The right headphone 32 and the left headphone 34 illustrated in FIG. 1 are inner ear headphones fitted to auricles of the user. This is merely an example and the right headphone 32 and the left headphone 34 are not limited as long as they can output a sound.

A sound output from the right headphone 32 and the left headphone 34 by controlling of a voice processing unit 170 and an information output control unit 179 described below is a voice of a person or a sound that mimics a voice of a person, but the invention is not limited thereto. The sound output by the right headphone 32 and the left headphone 34 may be a sound in an audible range which can be recognized by the auditory sense of the user and includes an animal sound, a mechanical sound, or any kind of sound. In the present embodiment, an example of outputting a voice of a person or a sound that mimics a voice of a person as described above will be described.

In a case where the display device has a configuration in which the sound is output such that the user can hear the sound and the surrounding people of the user hardly hear the sound, it is preferable from a viewpoint that only the user using the head mounted display device 100 can hear the sound without affecting people surrounding the user. For example, the right headphone 32 and the left headphone 34 may be canal type headphones, ear-covering type headphones, sealing type headphones that cover the auricles of the user, or open air type headphones in addition to inner ear type headphones. In addition, a bone conduction speaker may be provided for the head mounted display device 100 in place of the right headphone 32 and the left headphone 34 or in addition to the right headphone 32 and the left headphone 34. In this case, it is preferable that the bone conduction speaker is provided for one or both of the right holding unit 21 and the left holding unit 23 which are easily brought into contact with the head portion of the user.

The specific specification of the microphone 63 is optional. The microphone 63 may be a directional microphone or a nondirectional microphone. Examples of the directional microphone include a cardioid microphone, a supercardioid microphone, a hypercardioid microphone, and an ultracardioid microphone. In a case where the microphone 63 has directivity, the microphone may have a configuration in which the voice from the visual line direction of the user on which the head mounted display device 100 is mounted is particularly excellently collected and then detected. In this case, the microphone 63 or a component accommodating the microphone 63 may have structural characteristics in order to secure the directivity of the microphone 63. For example, in the example of FIG. 1, the microphone 63 and the coupling member 46 may be designed such that a sound collecting unit of the microphone 63 is directed to the visual line direction of the user in a state of the user on which the right headphone 32 and the left headphone 34 are mounted. Alternatively, the microphone 63 may be disposed by being embedded in the right holding unit 21 or the left holding unit 23. In this case, when a hole for collecting sound is formed on the front surface side of the right holding unit 21 or the left holding unit 23, that is, a surface which is located parallel to the right optical image display unit 26 and the left optical image display unit 28, the microphone can have directivity corresponding to the visual line direction of the user. The visual line direction of the user is, in other words, a direction in which the right optical image display unit 26 and the left optical image display unit 28 face, a direction toward the center of the visual field which is seen by the user over the right optical image display unit 26 and the left optical image display unit 28, or an imaging direction of the camera 61. In addition, the direction of the directivity of the microphone 63 may vary. In this case, the microphone may have a configuration in which the visual line direction of the user is detected and the visual line direction of the microphone 63 is adjusted so as to face the direction.

In addition, the right cord 42 and the left cord 44 can be combined into one cord. A conductive wire in the inside of the right cord 42 is drawn into the left holding unit 23 side through the inside of the main body of the image display unit 20 and coated with a resin together with a conductive wire in the inside of the left cord 44, and both cords may be combined into one cord.

The image display unit 20 and the control device 10 transmit various signals through the connecting unit 40. The end portion on the opposite side of the coupling member 46 in the main cord 48 and the control device 10 are respectively provided with connectors (not illustrated) engaged with each other. The control device 10 and the image display unit 20 are connected with each other or separated from each other due to engagement or disengagement of the connector of the main cord 48 and the connector of the control device 10. For example, metal cables or optical fibers can be applied to the right cord 42, the left cord 44, and the main cord 48.

The control device 10 is a device that controls the head mounted display device 100. The control device 10 includes switches having a determination key 11, a lighting unit 12, a display switching key 13, a brightness switching key 15, a direction key 16, a menu key 17, and a power supply switch 18. Further, the control device 10 includes a trackpad 14 that is manipulated by a touch operation of the user using a finger.

The determination key 11 outputs a signal that detects a pressing operation and determines the content operated by the control device 10. The lighting unit 12 notifies an operation state of the head mounted display device 100 according to the light emission state thereof. As the operation state of the head mounted display device 100, an On or Off state of the power supply can be exemplified. For example, a light emitting diode (LED) is used as the lighting unit 12. The display switching key 13 detects the pressing operation and outputs a signal that switches the display mode of a content video with 3D or 2D.

The trackpad 14 detects the operation of the user using a finger of the user on the operation surface of the trackpad 14 and outputs a signal according to the detected contents. As the trackpad 14, various trackpads such as an electrostatic trackpad, a pressure detecting trackpad, and an optical trackpad can be employed. The brightness switching key 15 detects a pressing operation and outputs a signal that increases or decreases the brightness of the image display unit 20. The operation key 16 detects the pressing operation on the key corresponding to the vertical direction and the horizontal direction and outputs a signal according to the detected contents. The power supply switch 18 switches the power supply state of the head mounted display device 100 by detecting a slide operation of the switch.

Figure 2:
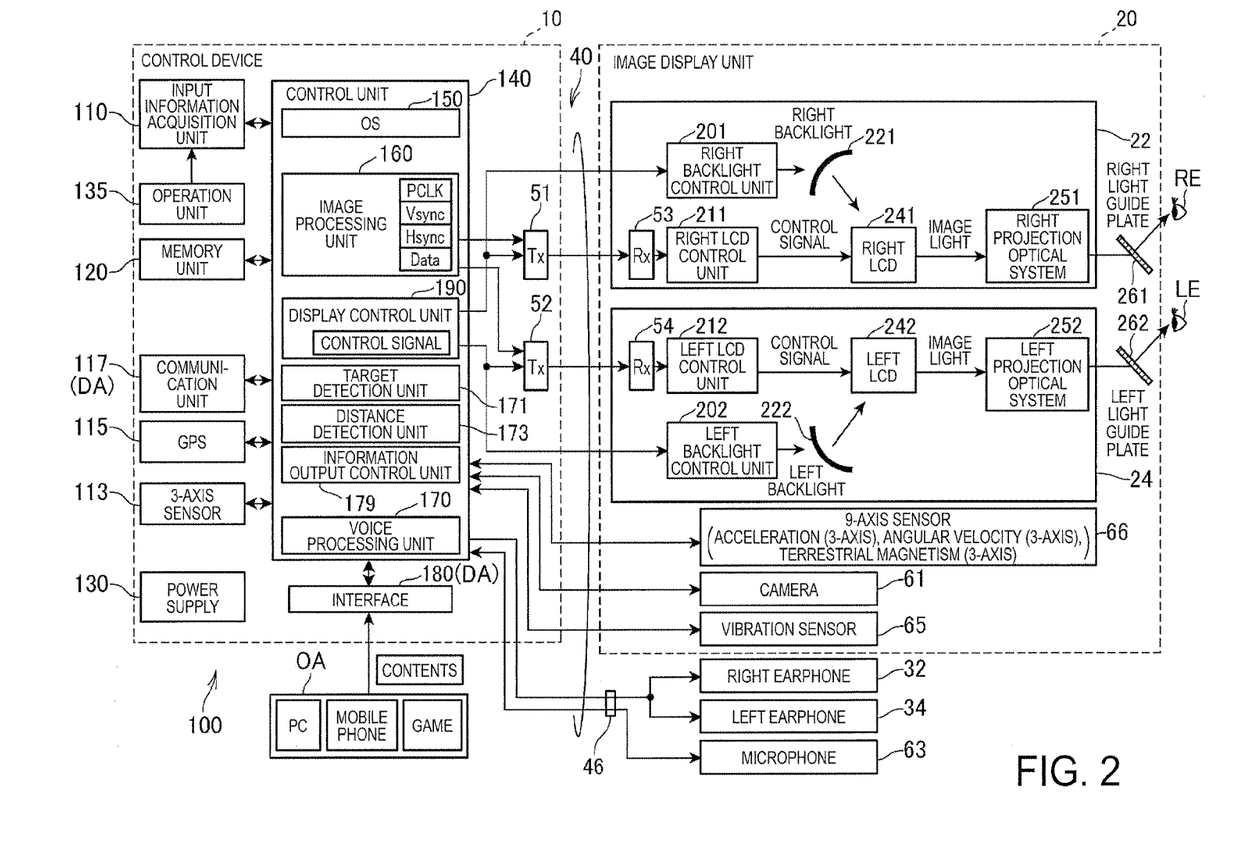
FIG. 2 is a block diagram illustrating a functional configuration of the head mounted display device.

FIG. 2 is a functional block diagram of respective units constituting a display system 1 according to the present embodiment.

As illustrated in FIG. 2, the display system 1 includes an external device OA and the head mounted display device 100. Examples of the external device OA include a personal computer (PC), a mobile phone terminal, and a game terminal. The external device OA is used as an image supply device that supplies an image to the head mounted display device 100.

The control device 10 of the head mounted display device 100 includes a control unit 140, an operation unit 135, an input information acquisition unit 110, a memory unit 120, a power supply 130, an interface 180, a transmission unit (Tx) 51, and a transmission unit (Tx) 52.

The operation unit 135 detects the operation of the user. The operation unit 135 includes respective units such as the determination key 11, the display switching key 13, the trackpad 14, the brightness switching key 15, the direction key 16, the menu key 17, and the power supply switch 18 illustrated in FIG. 1.

The input information acquisition unit 110 acquires a signal according to an operation input performed by the user. As the signal according to the operation input, an operation input with respect to the trackpad 14, the direction key 16, or the power supply switch 18 can be exemplified.

The power supply 130 supplies power to respective units of the head mounted display device 100. As the power supply 130, for example, a secondary battery can be used.

The memory unit 120 stores various computer programs. The memory unit 120 is configured of a ROM or a RAM. The memory unit 120 may store image data displayed on the image display unit 20 of the head mounted display device 100.

The interface 180 is an interface for connecting various external devices OA serving as sources of supplying contents to the control device 10. As the interface 180, for example, an interface corresponding to the wired connection such as a USB interface, a micro USB interface, and an interface for a memory card can be used.

The control unit 140 realizes the functions of respective units by reading and executing the computer programs stored in the memory unit 120. That is, the control unit 140 functions as an operating system (OS) 150, an image processing unit 160, a voice processing unit 170, a target detection unit 171, a distance detection unit 173, an information output control unit 179, and a display control unit 190.

A 3-axis sensor 113, a GPS 115, and a communication unit 117 are connected to the control unit 140. The 3-axis sensor 113 is a 3-axis acceleration sensor and a detection value of the 3-axis sensor 113 can be acquired by the control unit 140. The GPS 115 includes an antenna (not illustrated), receives a global positioning system (GPS) signal, and acquires the current position of the control device 10. The GPS 115 outputs the current position or the current time acquired based on the GPS signal to the control unit 140. Further, the GPS 115 acquires the current time based on information included in the GPS signal and may have a function of correcting the time clocked by the control unit 140 of the control device 10.

The communication unit 117 performs wireless data communication in conformity with standards such as a wireless LAN (WiFi (registered trademark)), Miracast (registered trademark), and Bluetooth (registered trademark).

In a case where the external device OA is connected to the communication unit 117 in a wireless manner, the control unit 140 acquires content data from the communication unit 117 and performs control for displaying an image on the image display unit 20. Meanwhile, in a case where the external device OA is connected to the interface 180 in a wired manner, the control unit 140 acquires content data from the interface 180 and performs control for displaying an image on the image display unit 20. Accordingly, hereinafter, the communication unit 117 and the interface 180 are collectively referred to as data acquisition units DA.

The data acquisition units DA acquire the content data to be displayed by the head mounted display device 100 from the external device OA. As the content data, various kinds of data such as image data or the text data can be used.

The image processing unit 160 acquires an image signal included in the contents. The image processing unit 160 separates a synchronization signal such as a vertical synchronization signal VSync or a horizontal synchronization signal HSync from the acquired image signal. Further, the image processing unit 160 generates a clock signal PCLK using a phase locked loop (PLL) circuit (not illustrated) or the like according to the synchronization of the separated vertical synchronization signal VSync or horizontal synchronization signal HSync. The image processing unit 160 converts an analog image signal from which a synchronization signal is separated to a digital image signal using an A/D conversion circuit (not illustrated) or the like. Next, the image processing unit 160 stores the converted digital image signal in a DRAM of the memory unit 120 for each frame as image data (in the figure, Data) of the target image. The image data is, for example, RGB data.

In addition, the image processing unit 160 may perform image processing, for example, various color tone correction processing such as resolution conversion processing and adjusting the brightness or saturation, and keystone correction processing with respect to the image data as needed.

The image processing unit 160 transmits each of the generated clock signal PCLK, the vertical synchronization signal VSync, the horizontal synchronization signal HSync, and image data Data stored in the DRAM of the memory unit 120 through the transmission units 51 and 52. The image data Data transmitted through the transmission unit 51 is referred to as "image data for the right eye" and the image data Data transmitted through the transmission unit 52 is referred to as "image data for the left eye." The transmission units 51 and 52 function as a transceiver for serial transmission between the control device 10 and the image display unit 20.

The display control unit 190 generates a control signal that controls the right display driving unit 22 and the left display driving unit 24. Specifically, the display control unit 190 individually controls, with the control signal, ON/OFF driving of a right LCD 241 using a right LCD control unit 211; ON/OFF driving of a right backlight 221 using a right backlight control unit 201; ON/OFF driving of a left LCD 242 using a left LCD control unit 212; and ON/OFF driving of a left backlight 222 using a left backlight control unit 202. In this manner, the display control unit 190 controls generation and emission of image light using each of the right display driving unit 22 and the left display driving unit 24. For example, the display control unit 190 allows both of the right display driving unit 22 and the left display driving unit 24 to generate image light, allows only one of the right display driving unit 22 and the left display driving unit 24 to generate image light, or allows both not to generate image light.

The display control unit 190 respectively transmits the control signals to the right LCD control unit 211 and the left LCD control unit 212 through the transmission units 51 and 52. In addition, the display control unit 190 respectively transmits the control signals to the right backlight control unit 201 and the left backlight control unit 202.

The image display unit 20 includes the right display driving unit 22, the left display driving unit 24, the right light guide plate 261 serving as the light optical image display unit 26, the left light guide plate 262 serving as the left optical image display unit 28, the camera 61, a vibration sensor 65, and a 9-axis sensor 66.

The vibration sensor 65 is configured using an acceleration sensor and is arranged in the inside of the image display unit 20 as illustrated in FIG. 1. In the right holding unit 21 of the example of FIG. 1, the vibration sensor 65 is incorporated in the vicinity of the end portion ER of the right optical image display unit 26. In a case where the user performs an operation of knocking the end portion ER, the vibration sensor 65 detects the vibration caused by the operation and outputs the detected results to the control unit 140. The control unit 140 detects the knocking operation of the user using the detected results of the vibration sensor 65.

The 9-axis sensor 66 is a motion sensor that detects the acceleration (3-axis), the angular velocity (3-axis), and the terrestrial magnetism (3-axis). Since the 9-axis sensor 66 is provided in the image display unit 20, the 9-axis sensor 66 detects the motion of the head of the user when the image display unit 20 is mounted on the head of the user. Since the orientation of the image display unit 20 can be seen from the detected motion of the head of the user, the control unit 140 can assume the visual line direction of the user.

The right display driving unit 22 includes a receiving unit (Rx) 53; a right backlight (BL) control unit 201 and a right backlight (BL) 221 functioning as light sources; a right LCD control unit 211 and a right LCD 241 functioning as display elements; and a right projection optical system 251. The right backlight control unit 201 and the right backlight 221 function as light sources. The right LCD control unit 211 and the right LCD 241 function as display elements. In addition, the right backlight control unit 201, the right LCD control unit 211, the right backlight 221, and the right LCD 241 are also collectively referred to as "image light generation units."

The receiving unit 53 functions as a receiver for serial transmission between the control device 10 and the image display unit 20. The right backlight control unit 201 drives the right backlight 221 based on the input control signal. The right backlight 221 is a light emitting body such as an LED or electroluminescence (EL). The right LCD control unit 211 drives the right LCD 241 based on the clock signal PCLK input through the receiving unit 53, the vertical synchronization signal VSync, the horizontal synchronization signal HSync, and image data Data 1 for a right eye. The right LCD 241 is a transmissive liquid crystal panel in which a plurality of pixels are arranged in a matrix.

The right projection optical system 251 is configured of a collimating lens that makes image light emitted from the right LCD 241 into a parallel light flux. The right light guide plate 261 serving as the right optical image display unit 26 guides the image light output from the right projection optical system 251 to a right eye RE of the user while reflecting the image light along a predetermined optical path. Further, the right projection optical system 251 and the right light guide plate 261 are also collectively referred to as "light guide units."

The left display driving unit 24 has a configuration which is the same as that of the right display driving unit 22. The left display driving unit 24 includes a receiving unit (Rx) 54; a left backlight (BL) control unit 202 and a left backlight (BL) 222 functioning as light sources; a left LCD control unit 212 and a left LCD 242 functioning as display elements; and a left projection optical system 252. The left backlight control unit 202 and the left backlight 222 function as light sources. The left LCD control unit 212 and the left LCD 242 function as display elements. In addition, the left backlight control unit 202, the left LCD control unit 212, the left backlight 222, and the left LCD 242 are also collectively referred to as "image light generation units." The left projection optical system 252 is configured of a collimating lens that makes image light emitted from the left LCD 242 into a parallel light flux. The left light guide plate 262 serving as the left optical image display unit 28 guides the image light output from the left projection optical system 252 to a left eye LE of the user while reflecting the image light along a predetermined optical path. Further, the left projection optical system 252 and the left light guide plate 262 are also collectively referred to as "light guide units."

The head mounted display device 100 displays an image based on content data such that the image overlaps the outside scenery in a case where the user sees the outside scenery through the right optical image display unit 26 and the left optical image display unit 28.

The target detection unit 171 performs control of allowing the camera 61 to image the target and acquires the captured image. The captured image is output from the camera 61 as colored image data or monochrome image data, but the camera 61 outputs the image signal and the target detection unit 171 may generate the image data conforming to a predetermined file format from the image signal.

The target detection unit 171 analyzes the acquired captured image data and detects the target reflected on the captured image data. The target is an object or a person present in the imaging direction of the camera 61, that is, the visual line direction of the user. In addition, the target may include an object (including a surface such as a wall surface) on which a video or an image is projected, or a video or an image projected on the object may be used as the target.

In addition, the target detection unit 171 detects a target from the captured image of the camera 61 and may further detect the state of the target.

The distance detection unit 173 acquires the distance to the target detected by the target detection unit 171. For example, the distance detection unit 173 acquires the distance to the target based on the size of the target image detected by the target detection unit 171 in the captured image of the camera 61. In a case where the target is a person or an object making a sound, the distance detection unit 173 has a function of detecting the distance to the sound source.

Further, the head mounted display device 100 may include a distance meter that detects the distance to the target using laser light or ultrasonic waves. The distance meter includes a light source of laser light and a light receiving unit that receives reflected light of laser light emitted from the light source and detects the distance to the target based on a state in which laser light is received. Moreover, the distance meter may be, for example, an ultrasonic wave type distance meter. That is, a distance meter that includes a sound source emitting ultrasonic waves and a detection unit detecting ultrasonic waves reflected by the target and detecting the distance to the target based on the reflected ultrasonic waves may be used. Further, the distance meter can have a configuration in which a distance meter using laser light and a distance meter using ultrasonic waves are combined with each other. It is preferable that such a distance meter is provided in the right holding unit 21 of the image display unit 20 or the right display driving unit 22 and the distance meter may be disposed, for example, in a surface linearly arranged with the light adjusting plate 20A in a state of being directed to the front side. It is preferable that the direction in which the distance meter measures the distance is a visual line direction of the user similar to the imaging direction of the camera 61.

The distance detection unit 173 detects the distance to the target from the camera 61 or the distance meter, but the distance can be regarded as the distance from the user of the head mounted display device 100 to the target.

The information output control unit 179 (sound control unit) allows the image display unit 20 to display an image based on the results of processes of the target detection unit 171 and the distance detection unit 173. The image displayed by the image display unit 20 is an image based on the content data acquired by the data acquisition unit DA. For example, the content data includes a moving image, a still image, characters, and symbols, the information output control unit 179 outputs the content data or some pieces of data extracted from the content data to the display control unit 190 and the display control unit 190 displays an image.

In addition, the information output control unit 179 may control display attributes such as images or characters based on the distance to the target which is detected by the distance detection unit 173 with regard to the target detected by the target detection unit 171 or the state of the target detected by the target detection unit 171. The display attributes include the presence of character decoration such as the display size of characters, display colors, fonts, bold characters, or italic characters in a case where text data included in the content data is displayed. Further, images having square, oval, and circular shapes can be arranged as the background of the text data and the display attributes may include the presence of the background, the size of the background, the shape, and the transparency of the background. In the case where the image data is displayed, the display attributes include the display size, the display color, and the transparency of the image.

Further, the information output control unit 179 controls the output of the voice from the right headphone 32 and the left headphone 34. The information output control unit 179 generates a voice signal based on voice data and outputs the signal to the voice processing unit 170 in a case where the content data acquired by the data acquisition unit DA includes the voice data (sound data). Further, in a case where the content data acquired by the data acquisition unit DA does not include the voice data, the information output control unit 179 acquires the voice data and stores the data in the memory unit 120 based on the voice signal collected by the microphone 63. The information output control unit 179 generates a voice signal based on the voice data stored in the memory unit 120 and outputs the signal to the voice processing unit 170.

Here, the information output control unit 179 may output the voice related to the target detected by the target detection unit 171. Further, the information output control unit 179 may output a voice according to the state of the target detected by the target detection unit 171.

In addition, a sound processed by the information output control unit 179 and output by the right headphone 32 and the left headphone 34 may be a sound in an audible range which can be recognized by the auditory sense of the user and includes a voice of a person, a sound that mimics a voice of a person, an animal sound, a mechanical sound, or any kind of sound. In the present embodiment, an example of outputting a voice of a person or a sound that mimics a voice of a person as described above will be described.

Further, the information output control unit 179 may convert or adjust the voice data included in the content data according to the characteristics of an auditory sense of a person. In the same manner, voice data of voices collected by the microphone 63 may be converted or adjusted. It is known that the audible range of a person is approximately in the range of 20 Hz to 20000 Hz, but individual differences are large and a sound in a high frequency bandwidth is difficult to hear due to the influence of aging. Further, a sound in a frequency bandwidth in which many people feel that they can easily hear the sound is a sound easily perceived by people even in a case where the sound has a low sound pressure. Here, the information output control unit 179 adjusts the voice data to become voice data that mostly includes the sound in the frequency bandwidth of 1000 Hz to 8000 Hz. The frequency bandwidth thereof is more preferably in the range of 1000 Hz to 4000 Hz, and still more preferably in the range of 2500 Hz to 4000 Hz. It is preferable that the voice data mostly include the components near the bandwidth of 3000 Hz. Further, the information output control unit 179 may convert or adjust the voice data so as to change a ratio of frequency components of a voice output from the right headphone 32 and the left headphone 34 according to the age of the user in a case where the age of the user of the head mounted display device 100 is set or input.

In addition, the information output control unit 179 may perform a noise filtering process that reduces noise components and/or sharpness processing of improving the sharpness of a voice with respect to the voice data collected by the microphone 63. The information output control unit 179 performs, for example, a process of removing or reducing the components in the frequency bandwidth corresponding to the noise components. The noise may be a voice of a person or an animal sound in addition to white noise or a low frequency sound. For example, in order for the user to easily hear the voice of an actor in the stage, a process of removing cheers of the audience from the voice data collected by the microphone 63 can be performed when the user of the head mounted display device 100 sees a play in a theater.

The voice processing unit 170 acquires the voice signal output by the information output control unit 179, amplifies the signal, and supplies the signal to a speaker (not illustrated) in the right headphone 32 and a speaker (not illustrated) in the left headphone 34 connected to the coupling member 46. Further, for example, in a case where a Dolby (registered trademark) system is employed, a process is performed on the voice signal and different sounds whose frequencies are changed are output from each of the right headphone 32 and the left headphone 34.

Further, the voice processing unit 170 performs processing related to a voice by acquiring the voice collected by the microphone 63 and converting the voice to digital voice data. The generated voice data is output to the information output control unit 179. For example, the voice processing unit 170 recognizes individual voices of a plurality of people and may perform speaker recognition that identifies a person who is speaking for each voice by extracting characteristics from the acquired voices and modeling the voices.

The 3-axis sensor 113, the GPS 115, and the communication unit 117 are connected to the control unit 140. The 3-axis sensor 113 is the 3-axis acceleration sensor and the control unit 140 can detect the motion of the control device 10 and the direction of the motion by acquiring the detection value of the 3-axis sensor 113.

The GPS 115 includes an antenna (not illustrated), receives a global positioning system (GPS) signal, and acquires the current position of the control device 10. The GPS 115 outputs the current position or the current time acquired based on the GPS signal to the control unit 140. Further, the GPS 115 acquires the current time based on information included in the GPS signal and may have a function of correcting the time clocked by the control unit 140 of the control device 10.

The communication unit 117 performs wireless data communication in conformity with standards such as a wireless LAN (WiFi (registered trademark)) and Bluetooth (registered trademark).

The interface 180 is an interface for connecting various image supply devices OA serving as sources of supplying contents to the control device 10. The contents supplied by the image supply device OA includes moving images or still images and may include voices. As the image supply device OA, a personal computer (PC), a mobile phone terminal, or a game terminal can be exemplified. As the interface 180, for example, a USB interface, a micro USB interface, an interface for a memory card or the like can be used.

Here, the image supply device OA can be connected to the control device 10 using a wireless communication line. In this case, the image supply device OA performs wireless communication with the communication unit 117 and transmits content data using a wireless communication technique such as Miracast (registered trademark).

Figure 3:
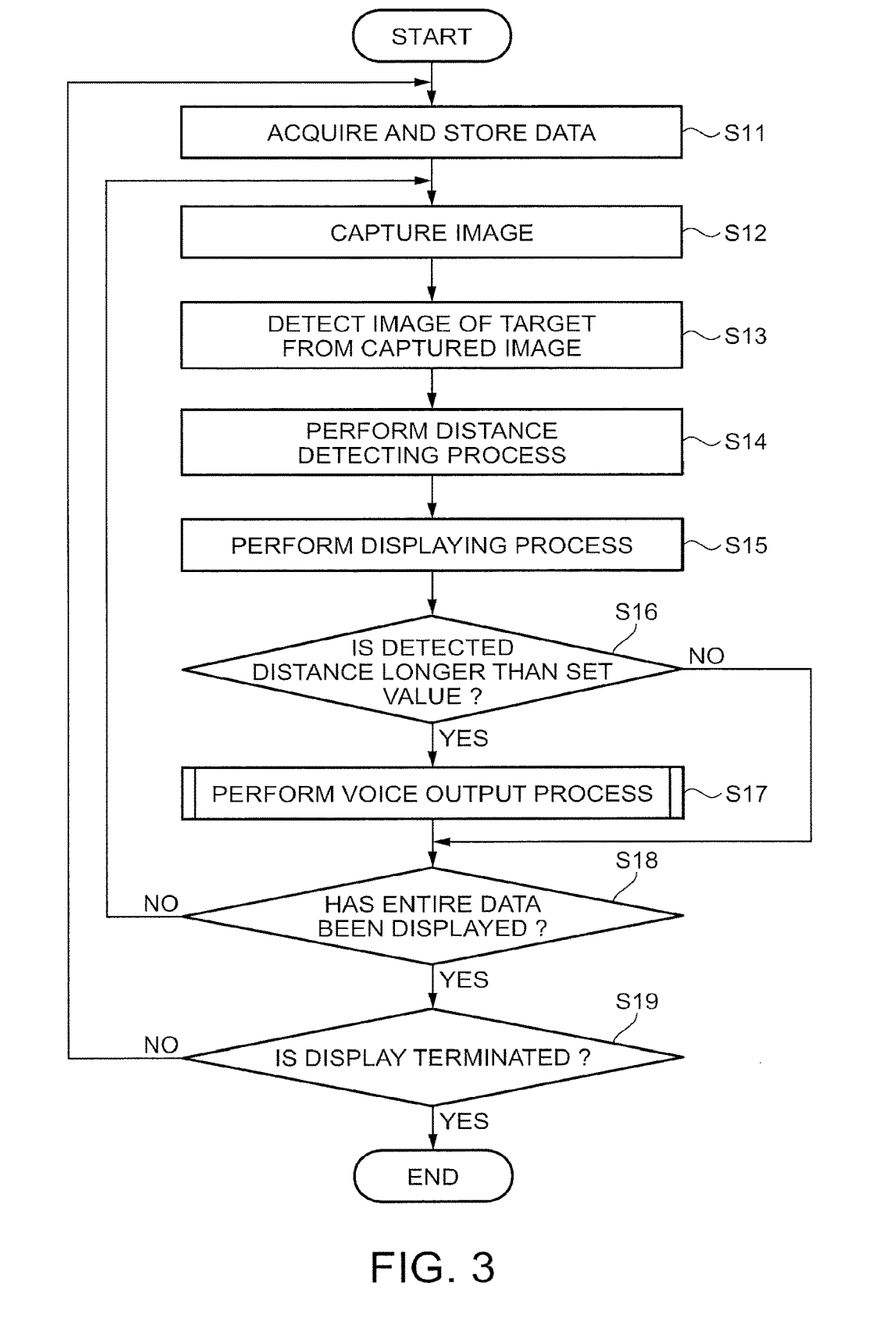
FIG. 3 is a flowchart illustrating an operation of the head mounted display device.

FIG. 3 is a flowchart illustrating an operation of the head mounted display device 100 and particularly shows a process of using the function of the information output control unit 179. Further, FIG. 3 shows an operation of the head mounted display device 100 that displays text or an image based on the content data and outputs a voice.

First, the control unit 140 acquires content data using the data acquisition unit DA and stores the acquired data in the memory unit 120 (Step S11).

Next, the target detection unit 171 allows the camera 61 to capture an image and acquires the captured image (Step S12), and detects an image of the target from the captured image (Step S13). As the process of detecting the target by the target detection unit 171, two processes can be exemplified. A first process is a process of using data which shows characteristics of the image of the detected target and is stored in the memory unit 120 in advance. Specifically, the target detection unit 171 acquires data showing characteristics of the image from the memory unit 120 and searches a part matching the characteristics in the captured image. The target detected in the first process is a target matching the data stored in the memory unit 120 in advance. A second process is a process of cutting out an image of a person or an object reflected in the captured image by the target detection unit 171 extracting the contour thereof in the captured image and setting the cut-out image as an image of a target in a case where an image having a predetermined size or greater is cut out. In a case where images with a plurality of targets are detected in the first and second processes, the target detection unit 171 may select one target closer to the visual line direction of the user. For example, an image of a target close to the center in the captured image of the camera 61 may be selected.

Next, the distance detection unit 173 performs a distance detecting process that detects the distance to the target detected by the target detection unit 171 (Step S14).

Further, the information output control unit 179 performs a displaying process, extracts some pieces of the content data acquired in Step S11, and allows the image display unit 20 to display an image (Step S15).

Here, the information output control unit 179 determines whether the distance to the target detected by the distance detection unit 173 is longer than a set value (Step S16). In addition, in a case where the detected distance is longer than the set value (Step S16: YES), the information output control unit 179 performs a voice output process (Step S17), outputs a voice from the right headphone 32 and the left headphone 34, and proceeds to Step S18. The details of the voice output process will be described below with reference to FIG. 4. The set value is a value which is set in advance as a reference of outputting a voice and stored in the memory unit 120.

In addition, in a case where the distance detected by the distance detection unit 173 is shorter than or equal to the set value (Step S16: NO), the information output control unit proceeds to Step S18 without performing the voice output process.

In Step S18, the control unit 140 determines whether the entirety of the content data acquired in Step S1 is processed in Steps S12 to S16. In a case where unprocessed data is present (Step S18: NO), the process returns to Step S12 and the control unit 140 performs a process on the unprocessed data. Further, in a case where the process on the entirety of data is terminated (Step S18: YES), the control unit 140 determines whether to finish displaying the data (Step S19). In the case where displaying of the data is continued (Step S19: NO), the process of the control unit 140 returns to Step S11. Further, in a case where displaying of the data is finished according to the operation or the like detected by the operation unit 135 (Step S19: YES), the control unit 140 stops the display of the image display unit 20 and finishes the main process.

Figure 4:
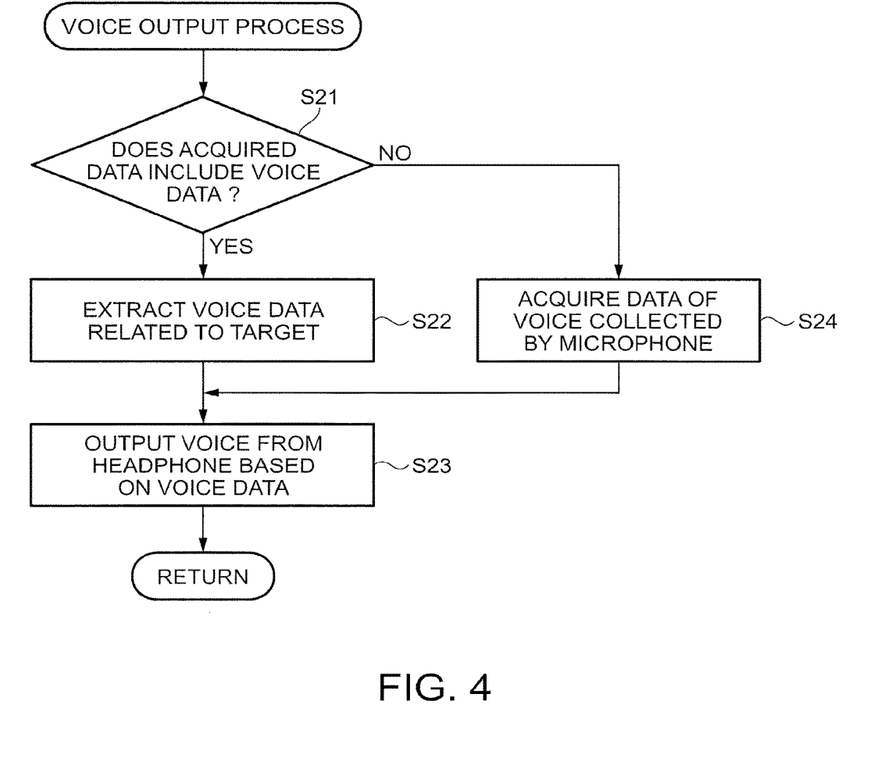
FIG. 4 is a flowchart specifically illustrating a sound output process.

FIG. 4 is a flowchart specifically illustrating the voice output process.

The information output control unit 179 determines whether the content data acquired by the data acquisition unit DA includes the voice data (Step S21). In a case where the content data includes the voice data (Step S21: YES), the information output control unit 179 extracts the voice data related to the target detected by the target detection unit 171 from the content data (Step S22). The information output control unit 179 generates a voice signal based on the voice data extracted in Step S22, outputs the signal to the voice processing unit 170, and outputs a voice from the right headphone 32 and the left headphone 34 (Step S23).

Meanwhile, the content data does not include voice data (Step S21: NO), the information output control unit 179 acquires the voice data generated based on the voice collected by the microphone 63 (Step S24). The information output control unit 179 generates a voice signal based on the voice data acquired in Step S24, outputs the signal to the voice processing unit 170, and outputs the voice from the right headphone 32 and the left headphone 34 (Step S23).

In addition, in Step S22, in a case where the voice data included in the content data does not have the voice data related to the target, the process may proceed to Step S24. In addition, during the operation of the head mounted display device 100, the voice processing unit 170 generates the voice data based on the voice collected by the microphone 63 and stores the data in the memory unit 120. In this case, the information output control unit 179 acquires the voice data generated by the voice processing unit 170 in Step S24 from the memory unit 120.

Figure 5A:
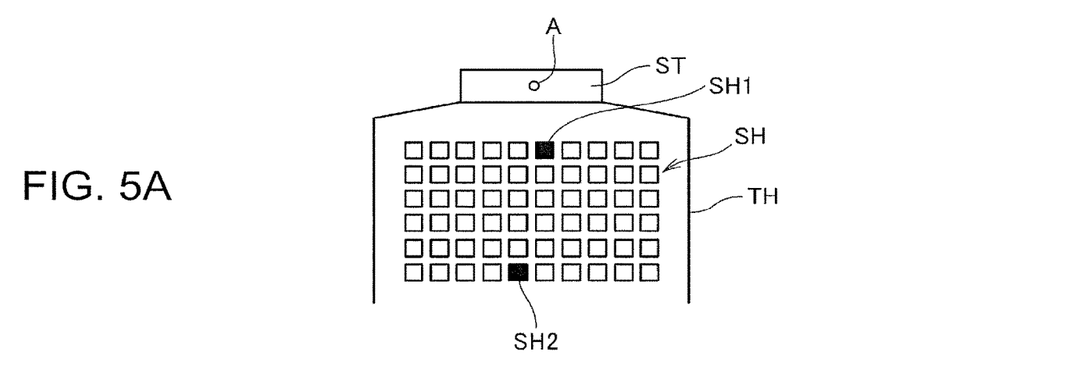
FIG. 5A is a view schematically illustrating a configuration of a theater in which the head mounted display device is used and FIGS. 5B and 5C illustrate examples of the field of vision of a user.
Figure 5B:
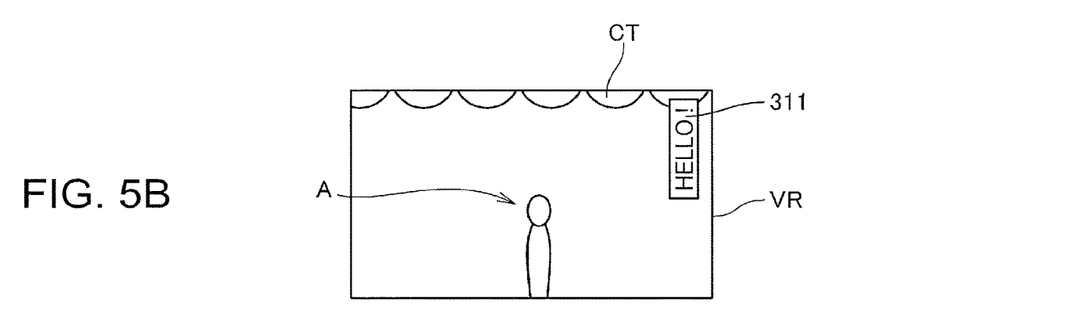
Figure 5C:
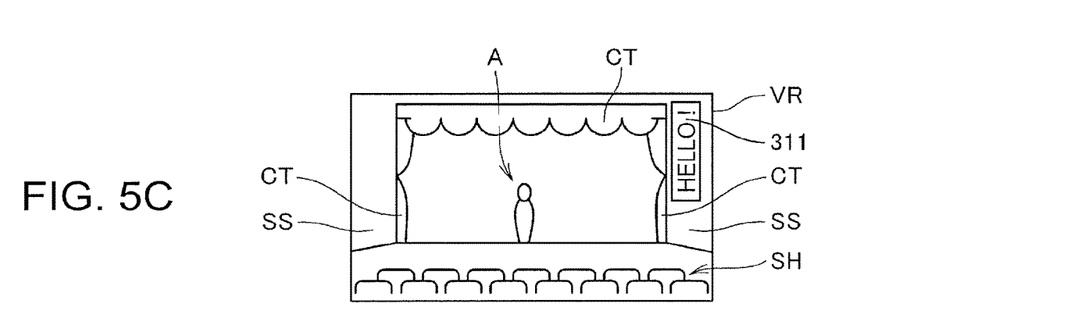

FIGS. 5A to 5C are views illustrating typical application examples of the head mounted display device 100. FIG. 5A is a view schematically illustrating a configuration of a theater TH in which the head mounted display device 100 is used and FIGS. 5B and 5C illustrate examples of the field of vision VR of the user using the head mounted display device 100 in the theater TH. The field of vision VR indicates the field of vision which is seen by the user over the right optical image display unit 26 and the left optical image display unit 28 of the image display unit 20. Since the image display unit 20 has a characteristic in which the image display unit 20 can be visually recognized through the outside scenery, the stage ST can be seen from the field of vision VR. The field of vision VR includes a curtain CT arranged above the stage ST and the left and right ends thereof and stage wings SS arranged on the left and right sides of the stage ST. An actor A is seen from the stage ST. In the example, the actor A is on the stage ST and seen by the user.

The theater TH illustrated in FIG. 5A has a configuration in which plural seats SH for the audience including the user of the head mounted display device 100 are arranged such that the seats SH are directed to a stage ST. The user of the head mounted display device 100 uses the head mounted display device 100 at the time of seeing the stage ST while being seated on the seat SH.

For example, FIG. 5B illustrates the field of vision VR of the user in a case where the user is seated in the seat SH1 in the vicinity of the stage ST. The field of vision VR includes a relatively small range having the figure of the actor A as the center that is present in the middle of the stage ST.

In this example, the content data acquired by the data acquisition unit DA includes text data related to a play program played in the theater TH. More specifically, the content data includes the lines uttered by the actor A and text described related to the play program. The text data of the entire play program or a part thereof is acquired in Step S11 (FIG. 3).

For example, in a case where the text data includes plural lines and/or plural text of description, the information output control unit 179 may display the content data acquired in Step S11 by dividing the data in plural times in accordance with the progression of the play program. In this case, the data showing the timing for displaying the text data may be included in the content data together with the text data. In the example of FIG. 5B, the text 311 is displayed based on the text data of the lines of the actor A.

In a case where the user is seated in the seat SH1, the user can directly hear the voice uttered by the actor A. Therefore, the head mounted display device 100 does not perform a process of outputting the voice so as not to affect the theater.

FIG. 5C illustrates the field of vision VR of the user in a case where the user is seated in the seat SH2 in a position separated from the stage ST. The field of vision is a wide range including the curtain CT and stage wings SS on both sides of the stage having the actor A in the middle of the stage ST as a center. In the example of FIG. 5C, the text 311 is displayed based on the text data which is the lines of the actor A.

In a case where the user is seated in the seat SH2, the distance from the head mounted display device 100 to the actor A is longer than the set value (Step S16 of FIG. 3). Accordingly, the information output control unit 179 outputs a voice based on the voice data included in the content data acquired by the data acquisition unit DA or the voice data of the voice collected by the microphone 63.

In the example, the target detection unit 171 detects the actor A as the target of the user in the visual line direction. The information output control unit 179 extracts the voice data related to the actor A and outputs the voice in a case where the voice data is included in the content data.

In a case where the microphone 63 has directivity as described above, the microphone 63 collects the voice heard from the stage ST. For this reason, the voice collected by the microphone 63 is a voice related to the stage ST and the voice of the actor is collected when the actor is uttering a voice. Accordingly, the information output control unit 179 outputs the voice based on the voice data of the voice collected by the microphone 63.

The voice or the like of the actor A is not heard or hardly heard by the user present in the seat SH2 which is separated from the stage ST. In this situation, the head mounted display device 100 can output the voice of the actor A to the user. Since the head mounted display device 100 outputs the voice from the right headphone 32 and the left headphone 34, the voice to be output is not heard by other members of the audience in the theater TH and does not provide a feeling of discomfort to surrounding people.

In this case, the information output control unit 179 may perform a process of reducing the sound other than the voice of the actor A, for example, the voices of the audience from the data of the voice collected by the microphone 63 by performing a noise filtering process.

Further, the information output control unit 179 can output the voice according to the state of the target detected by the target detection unit 171. In the example of 5C, the target detection unit 171 detects the actor A which is the target from the captured image and may detect whether the mouth of the actor A is open as the state of the target. In this case, the information output control unit 179 acquires data showing whether the mouth of the actor A is open from the target detection unit 171. The information output control unit 179 outputs the voice from the right headphone 32 and the left headphone 34 when the mouth of the actor A is open. In this case, it is possible to make the user of the head mounted display device 100 hear the natural voice close to the voice uttered by the actor A as it is. In addition, the information output control unit 179 analyzes the shape or the motion of the mouth of the actor A and may adjust the timing of outputting the voice.

In this case, the information output control unit 179 may adjust the timing of outputting the voice from the right headphone 32 and the left headphone 34 corresponding to the distance detected by the distance detection unit 173. For example, in a case where the user is seated in the seat SH separated from the stage ST, it takes time for the voice of the actor A on the stage ST to reach the user. For this reason, the distance detection unit 173 determines the timing of outputting the voice based on the captured image data and may correct the timing of outputting the voice based on the distance detected by the distance detection unit 173.

In addition, the information output control unit 179 extracts the voice of a specific person (for example, the actor A) from the voices collected by the microphone 63 and may output the voice from the right headphone 32 and the left headphone 34 by emphasizing the extracted voice. In a case where the microphone 63 has directivity, the information output control unit 179 analyzes the collected voices and separates the voices for each person and may extract the voice of a person with the highest volume. In addition, the information output control unit 179 may extract a specific voice based on the captured image of the camera 61.

In addition, the information output control unit 179 analyzes the content of the voice based on the voices collected by the microphone 63 and may adjust or change the data of the collected voices based on the content of the voice. For example, the information output control unit 179 performs a process of emphasizing the volume in a specific frequency bandwidth in order for the voice of a person to be easily heard by the user in a case where the voice collected by the microphone 63 is a voice of a person (for example, singing of an opera singer). Further, in a case where the content of the collected voice is a musical composition with a wide dynamic range, a process of emphasizing the high sound and the low sound in the voice data may be performed. Further, the right headphone 32 and the left headphone 34 have bone conduction speakers or subwoofers, the volume in the frequency bandwidth suitable for the bone conduction speaker or the subwoofer may be amplified.

In addition, in a case where a sound is output from a speaker or the like in an environment (for example, the theater TH) in which the user uses the head mounted display device 100 or in a case where a sound heard by the user such as a musical performance sound of a musical instrument can be collected in an environment of the head mounted display device 100, the information output control unit 179 may output the sound by cooperating these sound in the environment. For example, the information output control unit 179 may perform conversion or adjustment of the voice data and/or adjustment of the timing of outputting the sound of the right headphone 32 and the left headphone 34 corresponding to the distance to the sound source detected by the distance detection unit 173 in consideration of reverberation time. In this case, the user can hear a vivid and realistic sound with a high quality even when the user is in a position separated from the sound source.

Further, the information output control unit 179 may emphasize the voice data acquired by the data acquisition unit DA with the environmental sound collected by the microphone 63 to be output.

Alternatively, the information output control unit 179 analyzes the balance in which the user feels comfortable and may adjust or convert the voice data of the voice collected by the microphone 63 and the voice data acquired by the data acquisition unit DA so as to be a sound suitable for the user. Further, when the voice data of the voice collected by the microphone 63 and the voice data acquired by the data acquisition unit DA are synthesized, the ratio or the like of the volumes for each frequency component may be adjusted so as to be the sound suitable for the user. The distribution at the time of synthesis may be determined through automatic analysis or may be preset, or set by the user operating the control device 10.

The head mounted display device 100 has a configuration in which the right headphone 32 and the left headphone 34 are respectively separated from the right holding unit 21 and the left holding unit 23 as illustrated in FIG. 1. For this reason, a method of using the head mounted display device 100 of mounting one of the right headphone 32 or the left headphone 34 on the user and hearing the environmental sound with the other ear is possible. In this case, the information output control unit 179 may output a monaural sound to the headphone to the side in which the user wears the headphone and may switch to a stereo sound and then output the sound in a case where the user wears both of the right headphone 32 and the left headphone 34.

As described above, the head mounted display device 100 according to the embodiment to which the invention is applied is used by being mounted on the body of the user and includes the image display unit 20 through which the outside scenery is transmitted and which displays the image such that the image can be visually recognized together with the outside scenery. In addition, the head mounted display device 100 includes the right headphone 32 and the left headphone 34 outputting the voice. In addition, the head mounted display device further includes the target detection unit 171 that detects the target of the user in the visual line direction, the distance detection unit 173 that detects the distance between the detected target and the user, and the information output control unit 179 that controls the output of the voice from the right headphone 32 and the left headphone 34 according to the detected distance. In this manner, the voice can be output corresponding to the external factor of the head mounted display device 100.

In addition, the head mounted display device 100 includes the data acquisition unit DA that acquires voice data related to the target. The information output control unit 179 outputs the voice acquired by the data acquisition unit DA to the right headphone 32 and the left headphone 34 in a case where the distance detected by the distance detection unit 173 is longer than the distance set in advance. Accordingly, the output of the voice can be controlled in correspondence with the distance between the head mounted display device 100 and the target.

In addition, the head mounted display device 100 includes the camera 61 that images the visual line direction of the user and the target detection unit 171 detects the target visually recognized by the user through the image display unit 20 based on the captured image of the camera 61. Therefore, the target of the user in the visual line direction can be detected based on the captured image.

Further, the target detection unit 171 detects the state of the target visually recognized by the user through the image display unit 20 based on the captured image of the camera 61 and the information output control unit 179 outputs the voice acquired by the data acquisition unit DA using the right headphone 32 and the left headphone 34 according to the state of the target detected by the target detection unit 171. Accordingly, the voice can be output in correspondence with the state of the target to be detected from the captured image.

In addition, there is an advantage that the voice output to the user is unlikely to leak to the surrounding area by means of using the right headphone 32 and the left headphone 34 mounted on the user as the voice output unit.

In addition, the head mounted display device 100 includes the microphone 63 that detects the voice. The information output control unit 179 detects the voice uttered by the target detected by the target detection unit 171 using the microphone 63 and outputs the detected voice or a voice having the same content as the detected voice from the right headphone 32 and the left headphone 34. In this manner, the head mounted display device 100 can output the detected voice or a voice having the same content as the detected voice.

Further, the invention is not limited to the configurations of the above-described embodiment and various modifications are possibly performed in the range without departing from the scope of the invention.

For example, in the above-described embodiments, the information output control unit 179 determines whether to output a voice based on the distance detected by the distance detection unit 173, but the invention is not limited thereto and the information output control unit may determine whether to output a voice according to the operation of the user or the conditions set in advance. In the example of FIG. 5A, in the case where the user of the head mounted display device 100 is seated in a position close to the stage ST, the voice may be output through the operation of the user.

In addition, the information output control unit 179 converts the text data included in the content data to voice data through a text read-out process and may output the voice based on the voice data. In addition, the information output control unit 179 may change the display mode according to the output of the voice in a case where the text or the image to be displayed by the image display unit 20 while the voice is output is the text or the image related to the voice to be output. Specifically, in a case where the text 311 illustrated in FIG. 5C is the lines of the actor A and the voice of the lines of the actor A is output, the display attributes of the text 311 while the voice is output may be changed. In this case, it is possible to provide presentation effects for the display of the text or the image according to the state of outputting the voice and to provide information related to the voice while the voice is output.

In addition, in the above-described embodiment, the example in which the head mounted display device 100 includes the control device 10 and the image display unit 20 and connects the elements with the main cord 48 has been described. However, without limited thereto, a functional unit included in the control device 10 may be integrally accommodated in the image display unit 20. For example, the image display unit 20 accommodates a secondary battery of the power supply 130 (FIG. 2). In this case, the head mounted display device 100 is configured of only the image display unit 20 used by being mounted on the head of the user, but the function thereof is sufficient for application of the invention.

With respect to the head mounted display device 100, a configuration in which information processing devices having processing functions such as a personal computer, a smartphone, a tablet computer, and a watch type computer transmit data for display and the image display unit 20 receives the data for display and then displays the data may be employed. In this case, the head mounted display device 100 functions as a display device of the above-described information processing device. Alternatively, a configuration in which the head mounted display device 100 is used as an information processing device having processing functions may be employed. In this case, the head mounted display device 100 can realize various kinds of functions by the CPU of the control unit 140 executing programs. Alternatively, the functions of the control device 10 and the image display device 20 can be arranged to be different from the example of FIG. 2 and, for example, the determination key 11, the display switching key 13, the trackpad 14, and the operation unit 135 may be respectively provided for the control device 10 and the image display unit 20.

In addition, in place of the image display unit 20, an image display unit having another system such as an image display unit to be mounted on the head of the user, for example, a cap or the like may be employed as an image display unit and may include a display unit that displays an image corresponding to the left eye of the user and a display unit that displays an image corresponding to the right eye of the user. In addition, the display device according to the invention may be configured as a head mounted display to be installed in a vehicle such as an automobile or an airplane. In addition, for example, the display device may be configured as a head mounted display built in a body-protecting tool such as a helmet or a head-up display (HUD) used for front glass of an automobile.

In addition, in the above-described embodiment, the example of the configuration in which the image display unit 20 and the control device 10 are separated from each other and connected to each other through the connecting unit 40 has been described, but a configuration in which the control device 10 and the image display unit 20 are integrated with each other and mounted on the head of the user can be employed.

In addition, the control device 10 and the image display unit 20 are connected to each other through a longer cable or a wireless communication line and a mobile electronic device including a laptop computer, a tablet computer, a desktop computer, a game machine, a mobile phone, a smartphone, or a portable media player; or a dedicated device may be used as the control device 10.

In addition, for example, as a configuration of generating image light in the image display unit 20, a configuration that includes an organic electroluminescence (EL) display and an organic EL control unit may be employed and liquid crystal on silicon (LCoS; registered trademark), a digital micromirror device or the like can be used. Further, for example, the invention can be applied to a laser retina projection type head mounted display. That is, a configuration of allowing the user to visually recognize an image in a manner in which the image generation unit includes a laser light source and an optical system that guides the laser light source to the eyes of the user, the laser light is incident to the eyes of the user to scan the retinas, and an image is formed on the retinas may be employed. In a case where a laser retina projection type head mounted display is employed, the expression "a region in which image light in an image light generation unit can be emitted" can be defined as an image region to be visually recognized by the eyes of the user.

As an optical system that guides image light to the eyes of the user, a configuration that includes an optical member through which external light incident toward a device from the outside is transmitted and allows the image light and the external light to be incident to the eyes of the user can be employed. Further, an optical member that is positioned on the front side of the eyes of the user and overlapped with a part or the entire visual field of the user may be used. In addition, a scanning type optical system of scanning laser light or the like to be used as image light may be employed. Further, the optical system is not limited to an optical system of guiding image light in the inside of the optical member, and an optical system that has only a function of guiding image light toward the eyes of the user by refracting and/or reflecting the image light may be employed.

Moreover, the invention may be applied to a display device to which a scanning optical system using an MEMS mirror is employed and which uses an MEMS display technique. That is, as image display elements, the display device may include a signal light forming unit, a scanning optical system having an MEMS mirror that scans light emitted by the signal light forming unit, and an optical member on which a virtual image is formed due to light scanned by the scanning optical system. In this configuration, the light emitted by the signal light forming unit is reflected on the MEMS mirror to be incident on the optical member, guided through the optical member, and reaches a surface on which a virtual image is formed. A virtual image is formed on the surface on which a virtual image is formed by scanning the light using the MEMS mirror and an image is visually recognized by the user capturing the virtual image with the eyes. An optical component in this case may be a component that guides light after performing reflection plural times such as the right light guide plate 261 and the left light guide plate 262 according to the above described embodiment or a half mirror surface may be used.

In addition, the display device according to the invention is not limited to a head mounted display device and various display devices such as a flat panel display and a projector can be employed. The display device according to the invention may be a device that allows a user to visually recognize an image using external light and image light and a device having a configuration in which an image is visually recognized by the user due to an optical member through which the external light is transmitted using the image light can be exemplified. Specifically, the invention can be applied to a display device that projects image light on a transmissive flat surface or curved surface (glass or transparent plastic) which is fixedly or movably arranged on a position separated from the user in addition to the configuration including an optical member through which the external light is transmitted in the above-described head mounted display. As an example, a configuration of a display device that allows a user riding on a vehicle or a user outside the vehicle to visually recognize the scenery, other than the vehicle, together with an image due to image light by projecting the image light on window glass of the vehicle can be exemplified. Further, a configuration of a display device that allows a user present in the vicinity of a display surface to visually recognize the scenery through the display surface together with an image due to image light by projecting the image light on a transparent, semitransparent, or colored transparent display surface fixedly arranged such as window glass of a building can be exemplified.

Further, a configuration in which at least a part of each functional block illustrated in FIG. 2 may be realized in hardware or realized in cooperation of hardware and software may be employed. In addition, the configuration is not limited to a configuration in which independent hardware resources are arranged as illustrated in FIG. 2. In addition, a program executed by the control unit 140 may be stored in the memory unit 120 or a memory unit in the control device 10 or may be executed by acquiring a program stored in an external device through the communication unit 117 or the interface 180. In addition, only the operation unit 135 may be formed as a single user interface (UI) in a configuration formed in the control device 10 or the power supply 130 in the present embodiment may be singly formed and exchangeable. In addition, the configuration formed in the control device 10 may be repeatedly formed in the image display unit 20. For example, the control unit 140 illustrated in FIG. 2 may be formed in both of the control device 10 and the image display unit 20 or functions of the control unit 140 formed in the control device 10 and the CPU formed in the image display unit 20 may be separately divided.

The entire disclosure of Japanese Patent Application No. 2014-156699, filed Jul. 31, 2014 is expressly incorporated by reference herein.

What is claimed is:

1. A display device which is used by being mounted on a body of a user, the display device comprising:
   a display through which outside scenery is transmitted and that displays an image such that the image is visually recognizable together with the outside scenery;
   a headphone that outputs a sound; and
   a processor configured to:
      detect a target of the user in a visual line direction;
      detect a state of the target visually recognized by the user through the display based on the image captured by a camera;
      detect a distance between the detected target and the user; and
      control the output of the sound from the headphone according to the detected distance, and acquired sound data according to the detected state of the target, the state of the target being at least one of (i) a shape of a mouth of the detected target, or (ii) a motion of the mouth of the detected target.

2. The display device according to claim 1, wherein the processor is configured to:
   acquire sound data related to the target, and
   allow the headphone to output the sound based on the acquired sound data upon detecting the distance is longer than a predetermined distance.

3. The display device according to claim 2, wherein:
   the camera is configured to capture the image in the visual line direction of the user, and
   the processor is configured to detect the target visually recognized by the user through the display based on the captured image of the camera.

4. The display device according to claim 3,
   wherein the target is a person, and the state of the target is whether the mouth of the person is opened or closed.

5. The display device according to claim 1, wherein the processor is configured to control the headphone to output a voice of a person or a sound that mimics a voice of a person.

6. The display device according to claim 1, wherein the processor is configured to:
   convert the acquired sound data to sound data including a component of a predetermined frequency bandwidth; and
   control the headphone to output the sound based on the converted sound data.

7. The display device according to claim 1, further comprising a microphone,
   wherein the processor acquires data of a sound collected by the microphone.

8. The display device according to claim 7, wherein the processor is configured to control the microphone to detect a sound made by the detected target, and control the headphone to output the detected sound or a sound having a content which is the same as a content of the detected sound.

9. The display device according to claim 1, wherein the headphone changes a frequency component of the acquired sound data based on the detected distance.

10. The display device according to claim 1,
    wherein the processor is configured to adjust a timing of the outputting of the sound based on the detected distance to the target.

11. The display device according to claim 1,
    wherein the processor is configured to further control the output of the sound from the headphone according to an age of the user.

12. The display device according to claim 1,
    wherein the target is a person performing in a program and the display further displays words uttered by the person and text related to the program.

13. A method of controlling a display device that includes a display through which outside scenery is transmitted and which displays an image such that the image is visually recognizable together with the outside scenery, and a headphone which outputs a sound, and the display device is used by being mounted on a body of a user, the method comprising:
    detecting a target of the user in a visual line direction;
    detecting a distance between the detected target and the user;
    detecting a state of the target visually recognized by the user through the display; and
    controlling the output of the sound according to the detected distance, and the detected state of the target, the state of the target being at least one of (i) a shape of a mouth of the detected target, or (ii) a motion of the mouth of the detected target.

14. A non-transitory computer readable medium which can be executed by a computer controlling a display device that includes a display through which outside scenery is transmitted and which displays an image such that the image is visually recognizable together with the outside scenery, and a headphone which outputs a sound, and the display device is used by being mounted on a body of a user, the non-transitory computer readable medium causing the computer to:
    detect a target of the user in a visual line direction;
    detect a state of the target visually recognized by the user through the display based on the image captured by a camera;
    detect a distance between the detected target and the user; and
    control the output of the sound from the headphone according to the detected distance, and acquired sound data according to the detected state of the target, the state of the target being at least one of (i) a shape of a mouth of the detected target, or (ii) a motion of the mouth of the detected target.

* * * * *